(12) United States Patent
Lin et al.

(10) Patent No.: US 8,605,417 B2
(45) Date of Patent: Dec. 10, 2013

(54) SLIDING HINGE AND ELECTRONIC DEVICE WITH THE SLIDING HINGE

(75) Inventors: Zheng-Cheng Lin, New Taipei (TW); Shun-Yu Hung, New Taipei (TW); Ting-Yuan Chang, New Taipei (TW)

(73) Assignee: Shin Zu Shing Co., Ltd, New Taipei (TW)

( * ) Notice: Subject to any disclaimer, the term of this patent is extended or adjusted under 35 U.S.C. 154(b) by 379 days.

(21) Appl. No.: 13/164,952

(22) Filed: Jun. 21, 2011

(65) Prior Publication Data

US 2012/0327564 A1  Dec. 27, 2012

(51) Int. Cl.
*G06F 1/16* (2006.01)

(52) U.S. Cl.
USPC ............ 361/679.05; 361/679.26; 361/679.27; 455/575.4

(58) Field of Classification Search
USPC .................................................. 361/679.05
See application file for complete search history.

(56) References Cited

U.S. PATENT DOCUMENTS

| | | | | |
|---|---|---|---|---|
| 6,028,768 A * | 2/2000 | Cipolla | .................... | 361/679.12 |
| 7,451,954 B1 * | 11/2008 | Peng | .......................... | 248/205.1 |
| 7,907,982 B2 * | 3/2011 | Juan et al. | .................. | 455/575.4 |
| 8,199,475 B2 * | 6/2012 | Yeh et al. | ................. | 361/679.27 |
| 2010/0285852 A1 * | 11/2010 | Stephenson | ................ | 455/575.4 |

* cited by examiner

*Primary Examiner* — Anthony Q Edwards
(74) *Attorney, Agent, or Firm* — Alan Kamrath; Kamrath IP Lawfirm, P.A.

(57) ABSTRACT

A sliding hinge has two sliding assemblies mounted on a cover of an electronic device, two pivoting assemblies mounted on a base of the electronic device and two retractable connecting assemblies. An end of one retractable connecting assembly is connected to the end of the other retractable connecting assembly. Another end of each retractable connecting assembly is pivotally connected to a corresponding sliding assembly and a corresponding pivoting assembly. The two retractable connecting assemblies of the sliding hinge provide sufficient resilient force to push and hold the cover of the electronic device, especially a large-sized electronic device, at the closed or open position.

20 Claims, 8 Drawing Sheets

SLIDING HINGE AND ELECTRONIC DEVICE WITH THE SLIDING HINGE

BACKGROUND OF THE INVENTION

1. Field of the Invention

The present invention relates to a sliding hinge, especially to a sliding hinge mounted between a base and a cover of an electronic device.

2. Description of the Prior Art(s)

A sliding hinge is commonly used in an electronic device such as a mobile phone, a portable computer and the like. The sliding hinge is mounted between a base and a cover of the electronic device to allow the cover to slide relative to the base. Furthermore, when the cover is disposed at an open position, the cover is capable of further pivoting relative to the base.

A conventional sliding hinge has a resilient positioning assembly connected to the base and the cover of the electronic device. When the cover slides relative to the base, resilient force of the resilient positioning assembly pushes the cover to stay at the open position or the closed position.

The resilient force of one resilient positioning assembly may be sufficient for holding the base and the cover of the small-sized mobile phone to stay at specific positions. However, as for the large-sized portable computer such as a tablet computer, the resilient force of the conventional sliding having only one resilient positioning assembly is insufficient for holding the base and the cover at the specific positions.

To overcome the shortcomings, the present invention provides a sliding hinge to mitigate or obviate the aforementioned problems.

SUMMARY OF THE INVENTION

The main objective of the present invention is to provide a sliding hinge. The sliding hinge has two sliding assemblies mounted on a cover of an electronic device, two pivoting assemblies mounted on a base of the electronic device and two retractable connecting assemblies. An end of one retractable connecting assembly is connected to the end of the other retractable connecting assembly. Another end of each retractable connecting assembly is pivotally connected to a corresponding sliding assembly and a corresponding pivoting assembly. The two retractable connecting assemblies of the sliding hinge provide sufficient resilient force to push and hold the cover of the electronic device, especially a large-sized electronic device, at the closed or open position.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
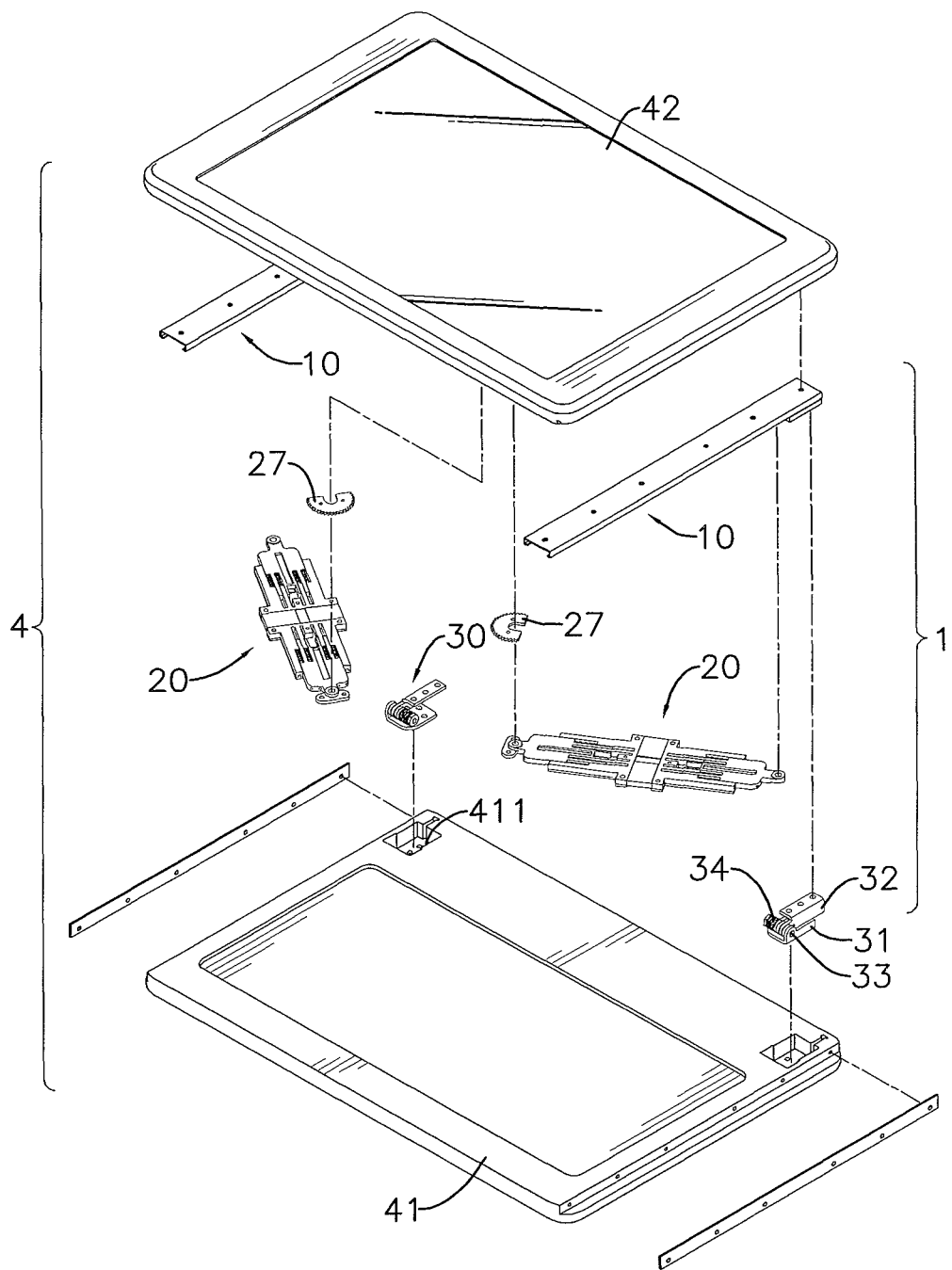
FIG. 1 is an exploded perspective view of an electronic device in accordance with the present invention.

With reference to FIG. 1, a sliding hinge 1 in accordance with the present invention comprises two sliding assemblies 10, two retractable connecting assemblies 20 and two pivoting assemblies 30.

Figure 2:
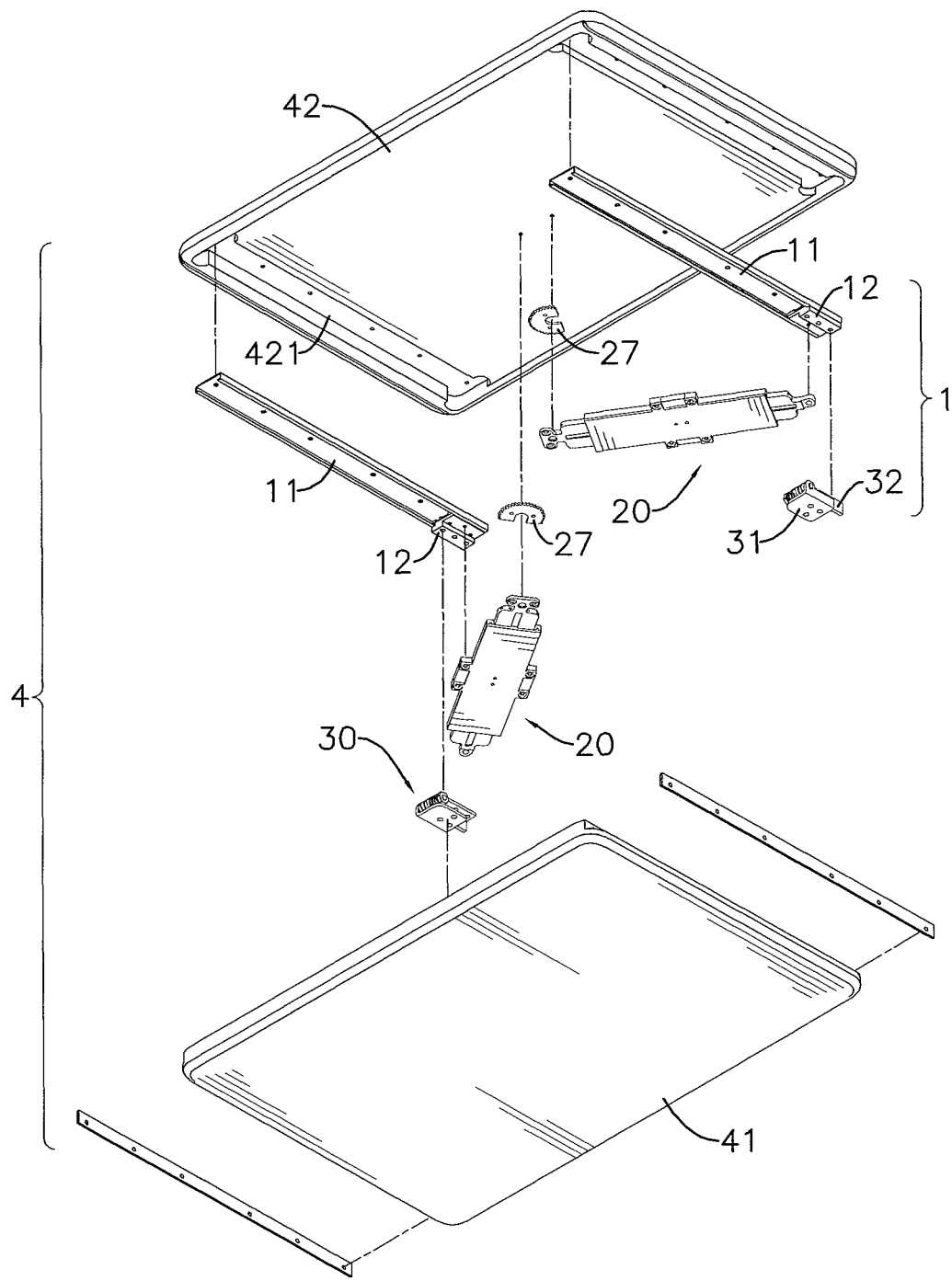
FIG. 2 is another exploded perspective view of the electronic device in FIG. 1.

With further reference to FIG. 2, each sliding assembly 10 has a track 11 and a slider 12. The slider 12 is slidably mounted on the track 11.

Figure 3:
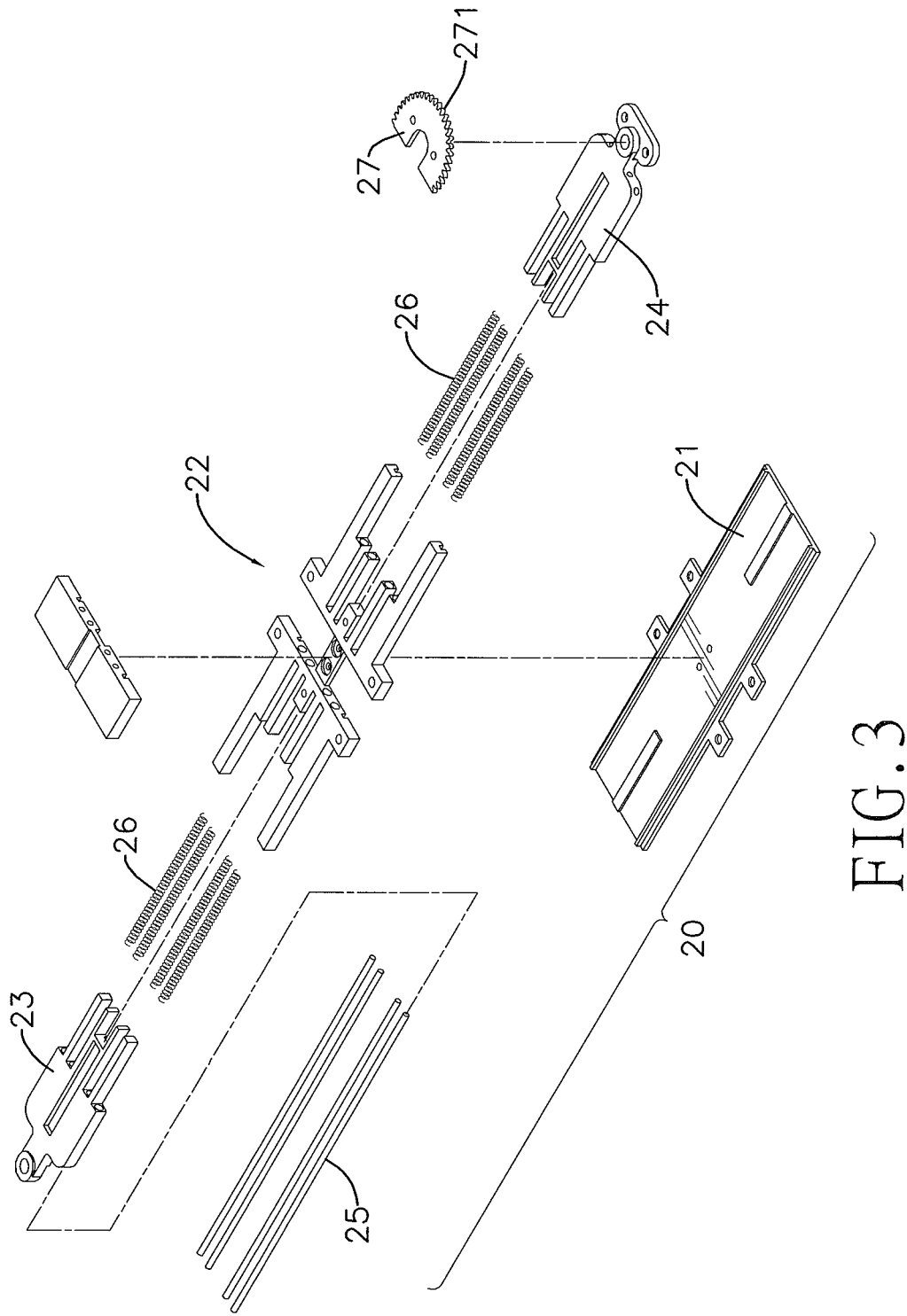
FIG. 3 is an exploded perspective view of a retractable connecting assembly of a sliding hinge of the electronic device in FIG. 1.

With further reference to FIG. 3, the retractable connecting assemblies 20 are mounted between the two sliding assemblies 10. Each retractable connecting assembly 20 has two opposite ends, a mounting panel 21, a mounting bracket 22, a first positioning element 23, a second positioning element 24, multiple mounting rods 25, at least one spring 26 and a connector 27. The ends of the retractable connecting assembly 20 are respectively connected to the slider 12 of a corresponding sliding assembly 10 and the end of the other retractable connecting assembly 20.

The mounting bracket 22 is securely mounted on the mounting panel 21 and has two opposite sides. The first positioning element 23 is disposed at one side of the mounting bracket 22 and is pivotally connected to the slider 12 of the corresponding sliding assembly 10. The second positioning element 24 is disposed at the other side of the mounting bracket 22.

The mounting rods 25 are separately disposed parallel to each other and are mounted through the first positioning element 23, the mounting bracket 22 and the second positioning element 24. The at least one spring 26 is disposed between the first and second positioning elements 23, 24. Preferably, each retractable connecting assembly 20 has two sets of springs 26. One set of springs 26 are mounted respectively on the mounting rods 25 and disposed between the mounting bracket 22 and the first positioning element 23. The other set of springs 26 are mounted respectively on the mounting rods 25 and disposed between the mounting bracket 22 and the second positioning element 24. Each spring 26 has two ends respectively abutting the mounting bracket 22 and a corresponding positioning element 23, 24.

Figure 4:
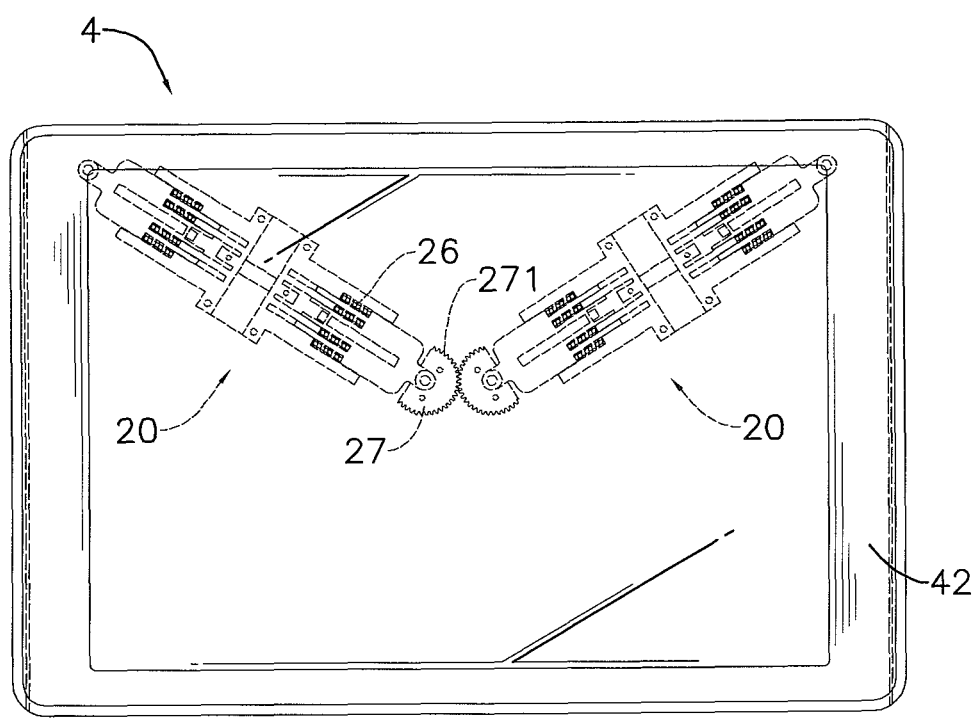
FIG. 4 is a top view of the electronic device in FIG. 1, shown closed, and the sliding hinge of the electronic device shown in phantom lines.

With further reference to FIG. 4, the connector 27 is rotatably mounted on the second positioning element 24 and is connected to the connector 27 of the other retractable connecting assembly 20. Preferably, the connector 27 is semicircular and has an arc edge and multiple teeth 271. The teeth 271 are formed in the arc edge of the connector 27 and engage the teeth 271 of the connector 27 of the other retractable connecting assembly 20.

Each pivoting assembly 30 has a stationary bracket 31, a rotating bracket 32, a pintle 33 and a torsion generating set 34. The rotating bracket 32 is connected to the slider 12 of a corresponding sliding assembly 10. The pintle 33 is securely mounted through the rotating bracket 32 and has a first end and a second end. The first end of the pintle 33 is rotatably mounted through the stationary bracket 31. The torsion generating set 34 is mounted around the pintle 33 and has multiple resilient discs and a fastener. The resilient discs are mounted around the pintle 33. The fastener may be a nut and is securely mounted on the second end of the pintle 33 and holds the resilient discs tightly between the stationary bracket 31, the rotating bracket 32 and the fastener. Thus, when the pintle 33 and the rotating bracket 32 rotate simultaneously relative to the stationary bracket 31, friction formed between the resilient discs allows the rotating bracket 32 to stay at specific positions.

With further reference to FIGS. 1 and 2, an electronic device 4 in accordance with the present invention comprises a base 41, a cover 42 and a sliding hinge 1 as described. The base 41 has a closing side, an opening side and two mounting recesses 411. The mounting recesses 411 are separately formed in a top surface of the base 41 adjacent to the opening side of the base 41. The cover 42 has two elongated recesses 421 parallelly formed in a bottom surface of the cover 42 and respectively corresponding to the mounting recesses 411 of the base 41. The sliding hinge 1 is mounted between the base 41 and the cover 42. The stationary brackets 31 of the pivoting assemblies 30 of the sliding hinge 1 are respectively mounted securely in the mounting recesses 411 of the base 41. Thus, the sliders 12 of the sliding assemblies 10 of the sliding hinge 1 are connected to the base 41 through the pivoting assemblies 30 and slide together with the base 41. The tracks 11 of the sliding assemblies 10 of the sliding hinge 1 are respectively mounted securely in the elongated recesses 421 of the cover 42. Consequently, the elongated recesses 421 of the cover 42 limit sliding ranges of the sliders 12 of the sliding assemblies 10 and prevent the slider 12 from dropping out of the tracks 11. The ends of the retractable positioning assemblies 20 where the connectors 27 are mounted are pivotally connected to the cover 42.

With reference to FIG. 4, when the electronic device 4 is folded, the retractable connecting assemblies 20 of the sliding hinge 1 extend obliquely to each other and toward the closing side of the base 41. Consequently, resilient force of the springs 26 of the sliding hinge 1 pushes the cover 42 toward the closing side of the base 41 to allow the cover 42 to stay at a closed position.

Figure 5:
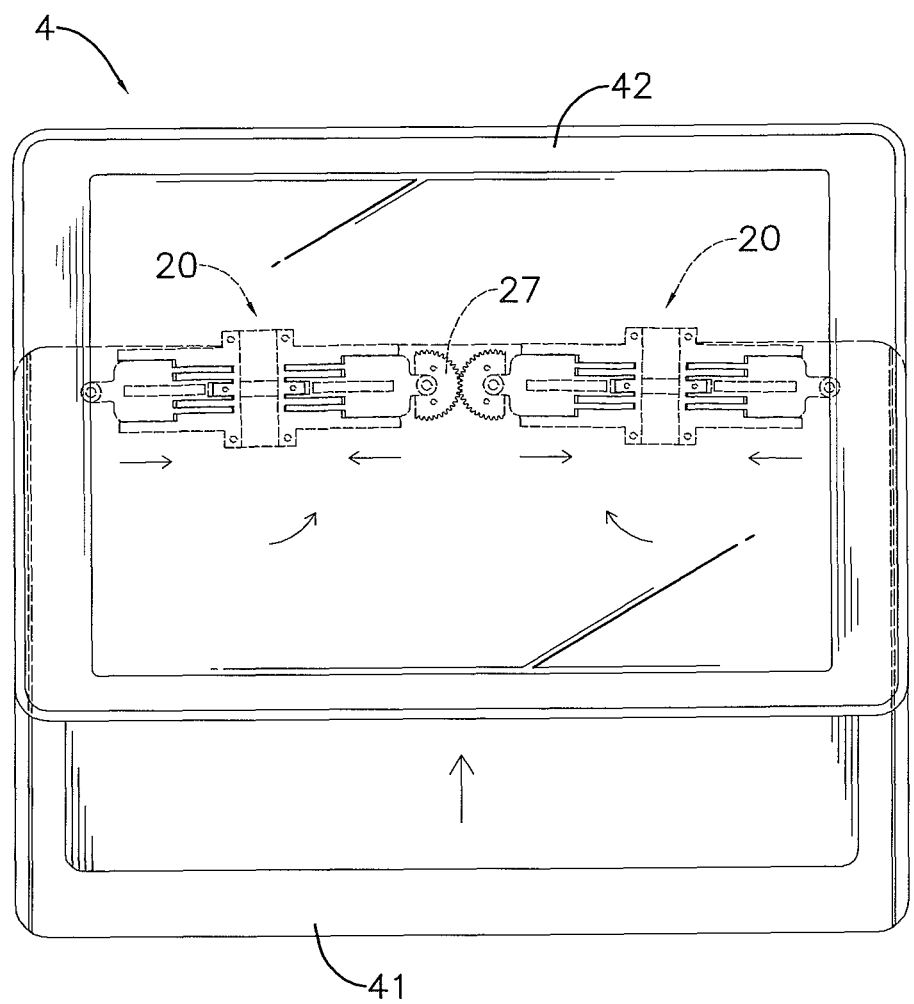
FIG. 5 is a top view of the electronic device in FIG. 1, shown opening, and the sliding hinge of the electronic device shown in phantom lines.

With further reference to FIG. 5, when the electronic device 4 is being opened, the cover 42 is pushed so the cover 42 and the tracks 11 slide relative to the slider 12 and the base 41 and toward the opening side of the base 41. As the cover 42 slides, the retractable connecting assemblies 20 retract and the springs 26 of the retractable connecting assemblies 20 are pressed.

Figure 6:
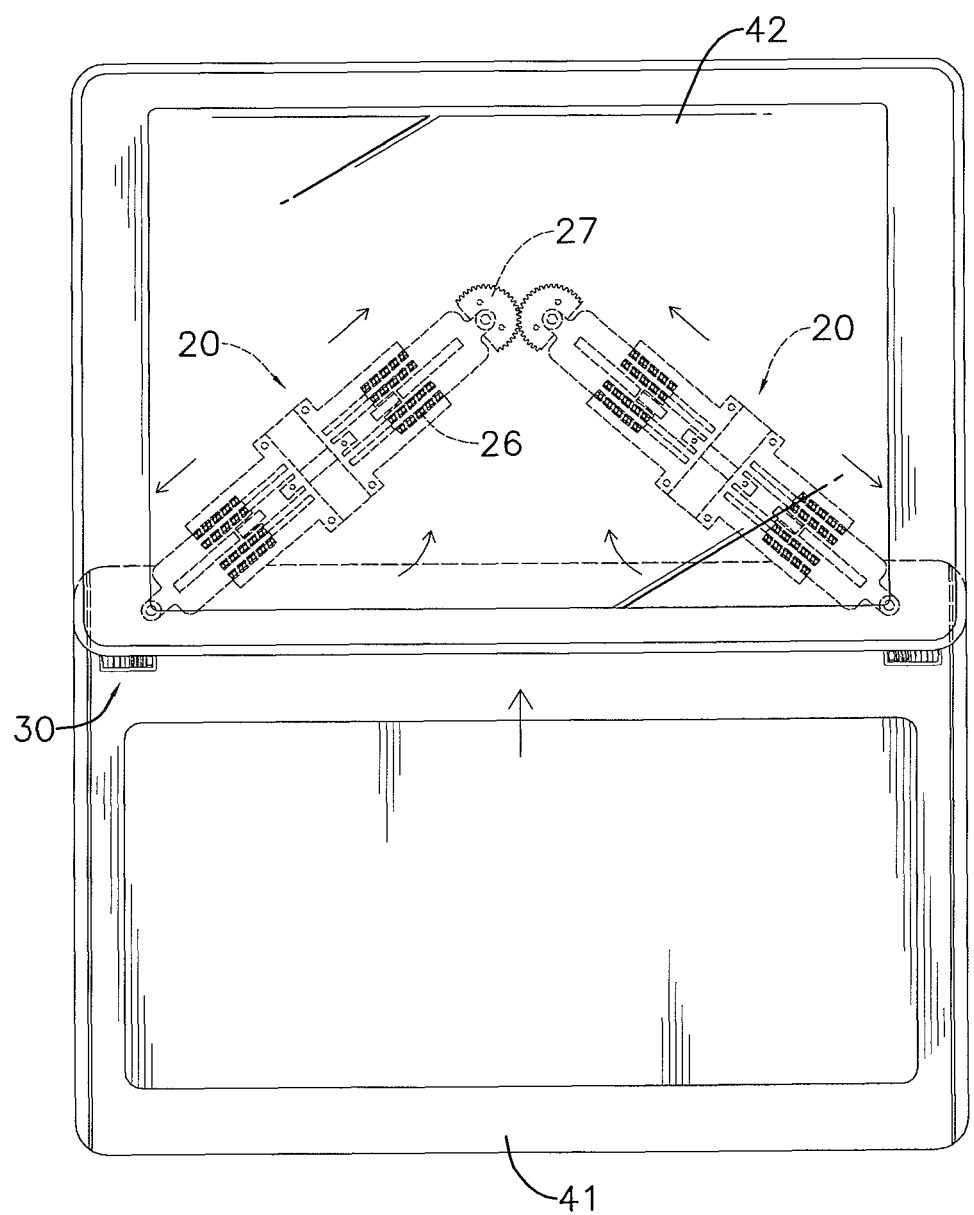
FIG. 6 is a top view of the electronic device in FIG. 1, shown open, and the sliding hinge of the electronic device shown in phantom lines.

With further reference to FIG. 6, when the cover 42 continues to be pushed toward the opening side of the base 41, the retractable connecting assemblies 20 shift to extend obliquely toward the opening side of the base 41. Then the resilient force of the springs 26 of the sliding hinge 1 pushes the cover 42 toward the opening side of the base 41 and allows the cover 42 to stay at an open position.

Figure 7:
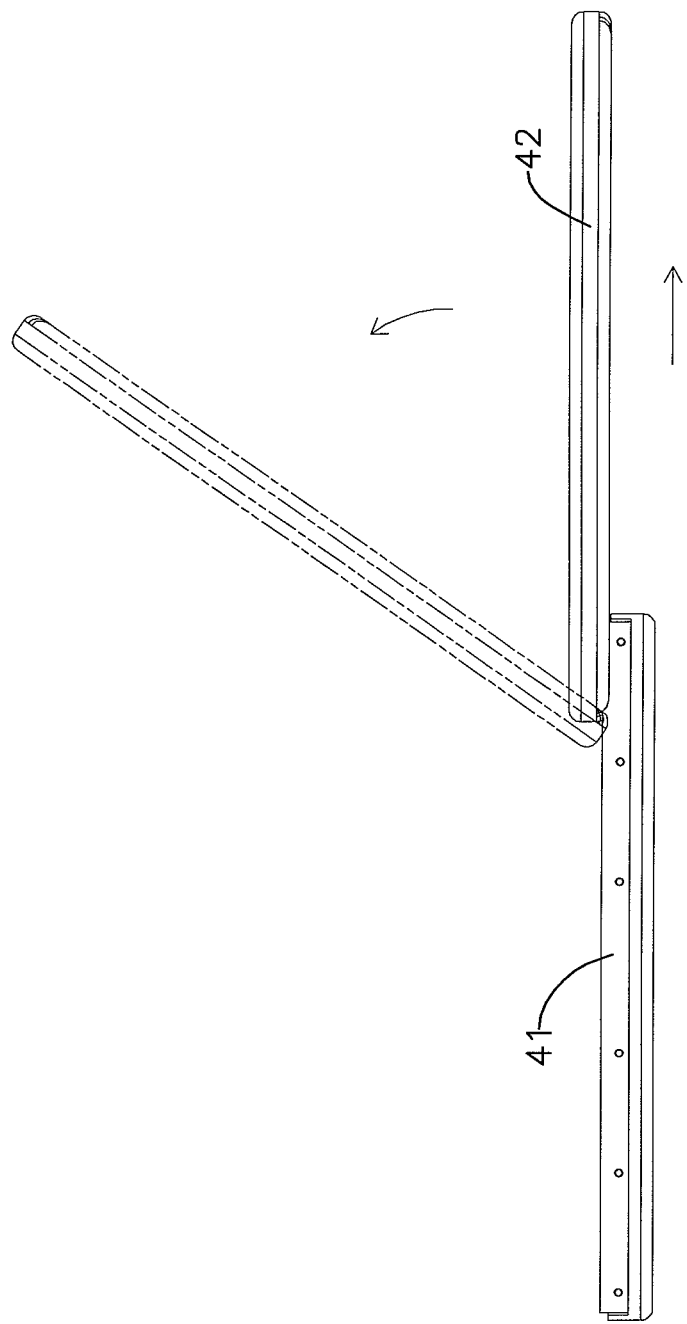
FIG. 7 is an operational side view of the electronic device in FIG. 1.
Figure 8:
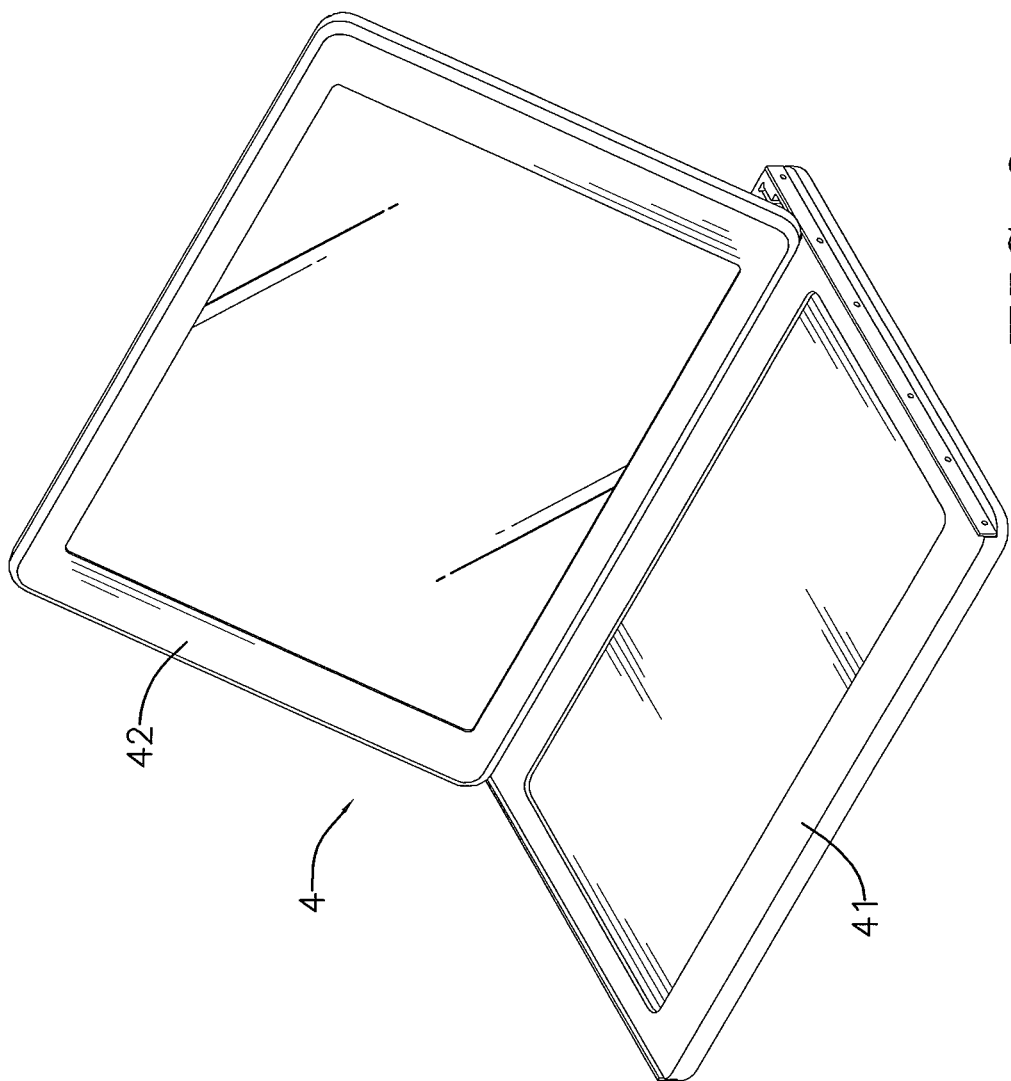
FIG. 8 is a perspective view of the electronic device in FIG. 1, shown open.

With further reference to FIGS. 7 and 8, the cover 42 is capable of pivoting upwardly relative to the base 41 and staying at the specific positions with the friction formed between the resilient discs of the torsion generating sets 34 of the pivoting assemblies 30. Afterwards, when the electronic device 4 is being folded, the cover 42 is pushed downwardly and then toward the closing side of the base 41.

The sliding hinge 1 as described has the following advantage. The two retractable connecting assemblies 20 of the sliding hinge 1 provide sufficient resilient force to push and hold the cover 42 of the electronic device 4, especially a large-sized electronic device 4, at the closed or open position.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A sliding hinge comprising
    two sliding assemblies, each sliding assembly having
        a track; and
        a slider slidably mounted on the track; and
    two retractable connecting assemblies mounted between the two sliding assemblies, and each retractable connecting assembly having two opposite ends respectively connected to the slider of a corresponding sliding assembly and the end of the other retractable connecting assembly.

2. The sliding hinge as claimed in claim 1, wherein each retractable connecting assembly further has
    a first positioning element pivotally connected to the slider of the corresponding sliding assembly;
    a second positioning element;
    at least one spring disposed between the first and second positioning elements; and
    a connector rotatably mounted on the second positioning element and connected to the connector of the other retractable connecting assembly.

3. The sliding hinge as claimed in claim 2, wherein each retractable connecting assembly further has
    a mounting bracket disposed between the first and second positioning elements;
    multiple mounting rods separately disposed parallel to each other and mounted through the first positioning element, the mounting bracket and the second positioning element; and
    two sets of springs, one set of springs mounted respectively on the mounting rods and disposed between the mounting bracket and the first positioning element, and the other set of springs mounted respectively on the mounting rods and disposed between the mounting bracket and the second positioning element, and each spring having two ends respectively abutting the mounting bracket and a corresponding positioning element.

4. The sliding hinge as claimed in claim 1 further comprising two pivoting assemblies, and each pivoting assembly having
    a stationary bracket;
    a rotating bracket connected to the slider of a corresponding sliding assembly;
    a pintle securely mounted through the rotating bracket and having
        a first end rotatably mounted through the stationary bracket; and
        a second end; and
    a torsion generating set mounted around the pintle and having
        multiple resilient discs mounted around the pintle; and
        a fastener securely mounted on the second end of the pintle and holding the resilient discs tightly between the stationary bracket, the rotating bracket and the fastener.

5. The sliding hinge as claimed in claim 2 further comprising two pivoting assemblies, and each pivoting assembly having a stationary bracket;
a rotating bracket connected to the slider of a corresponding sliding assembly;
a pintle securely mounted through the rotating bracket and having
a first end rotatably mounted through the stationary bracket; and
a second end; and
a torsion generating set mounted around the pintle and having
multiple resilient discs mounted around the pintle; and
a fastener securely mounted on the second end of the pintle and holding the resilient discs tightly between the stationary bracket, the rotating bracket and the fastener.

6. The sliding hinge as claimed in claim 3 further comprising two pivoting assemblies, and each pivoting assembly having
a stationary bracket;
a rotating bracket connected to the slider of a corresponding sliding assembly;
a pintle securely mounted through the rotating bracket and having
a first end rotatably mounted through the stationary bracket; and
a second end; and
a torsion generating set mounted around the pintle and having
multiple resilient discs mounted around the pintle; and
a fastener securely mounted on the second end of the pintle and holding the resilient discs tightly between the stationary bracket, the rotating bracket and the fastener.

7. The sliding hinge as claimed in claim 2, wherein the connector of each retractable connecting assembly is semicircular and has an arc edge and multiple teeth formed in the arc edge of the connector and engaging the teeth of the connector of the other retractable connecting assembly.

8. The sliding hinge as claimed in claim 3, wherein the connector of each retractable connecting assembly is semicircular and has an arc edge and multiple teeth formed in the arc edge of the connector and engaging the teeth of the connector of the other retractable connecting assembly.

9. The sliding hinge as claimed in claim 5, wherein the connector of each retractable connecting assembly is semicircular and has an arc edge and multiple teeth formed in the arc edge of the connector and engaging the teeth of the connector of the other retractable connecting assembly.

10. The sliding hinge as claimed in claim 6, wherein the connector of each retractable connecting assembly is semicircular and has an arc edge and multiple teeth formed in the arc edge of the connector and engaging the teeth of the connector of the other retractable connecting assembly.

11. The sliding hinge as claimed in claim 3, wherein
each retractable connecting assembly further has a mounting panel; and
the mounting bracket of each retractable connecting assembly is securely mounted on the mounting panel.

12. The sliding hinge as claimed in claim 6, wherein
each retractable connecting assembly further has a mounting panel; and
the mounting bracket of each retractable connecting assembly is securely mounted on the mounting panel.

13. An electronic device with a sliding hinge as claimed in claim 2 comprising
a base;
a cover having two elongated recesses parallelly formed in a bottom surface of the cover;
the sliding hinge mounted between the base and the cover;
the sliders of the sliding assemblies of the sliding hinge connected to the base; and
the ends of the retractable positioning assemblies where the connectors are mounted pivotally connected to the cover.

14. An electronic device with a sliding hinge as claimed in claim 5 comprising
a base having a closing side, an opening side and two mounting recesses separately formed in a top surface of the base adjacent to the opening side of the base;
a cover having two elongated recesses parallelly formed in a bottom surface of the cover and respectively corresponding to the mounting recesses of the base;
the sliding hinge mounted between the base and the cover;
the stationary brackets of the pivoting assemblies of the sliding hinge respectively mounted securely in the mounting recesses of the base;
the tracks of the sliding assemblies of the sliding hinge respectively mounted securely in the elongated recesses of the cover; and
the ends of the retractable positioning assemblies where the connectors are mounted pivotally connected to the cover.

15. An electronic device with a sliding hinge as claimed in claim 3 comprising
a base;
a cover having two elongated recesses parallelly formed in a bottom surface of the cover;
the sliding hinge mounted between the base and the cover;
the sliders of the sliding assemblies of the sliding hinge connected to the base; and
the ends of the retractable positioning assemblies where the connectors are mounted pivotally connected to the cover.

16. An electronic device with a sliding hinge as claimed in claim 7 comprising
a base;
a cover having two elongated recesses parallelly formed in a bottom surface of the cover;
the sliding hinge mounted between the base and the cover;
the sliders of the sliding assemblies of the sliding hinge connected to the base; and
the ends of the retractable positioning assemblies where the connectors are mounted pivotally connected to the cover.

17. An electronic device with a sliding hinge as claimed in claim 9 comprising
a base;
a cover having two elongated recesses parallelly formed in a bottom surface of the cover;
the sliding hinge mounted between the base and the cover;
the sliders of the sliding assemblies of the sliding hinge connected to the base; and
the ends of the retractable positioning assemblies where the connectors are mounted pivotally connected to the cover.

18. An electronic device with a sliding hinge as claimed in claim 6 comprising
a base having a closing side, an opening side and two mounting recesses separately formed in a top surface of the base adjacent to the opening side of the base;
a cover having two elongated recesses parallelly formed in a bottom surface of the cover and respectively corresponding to the mounting recesses of the base;
the sliding hinge mounted between the base and the cover;

the stationary brackets of the pivoting assemblies of the sliding hinge respectively mounted securely in the mounting recesses of the base;

the tracks of the sliding assemblies of the sliding hinge respectively mounted securely in the elongated recesses of the cover; and the ends of the retractable positioning assemblies where the connectors are mounted pivotally connected to the cover.

19. An electronic device with a sliding hinge as claimed in claim 8 comprising a base having a closing side, an opening side and two mounting recesses separately formed in a top surface of the base adjacent to the opening side of the base;

a cover having two elongated recesses parallelly formed in a bottom surface of the cover and respectively corresponding to the mounting recesses of the base;

the sliding hinge mounted between the base and the cover;

the stationary brackets of the pivoting assemblies of the sliding hinge respectively mounted securely in the mounting recesses of the base;

the tracks of the sliding assemblies of the sliding hinge respectively mounted securely in the elongated recesses of the cover; and the ends of the retractable positioning assemblies where the connectors are mounted pivotally connected to the cover.

20. An electronic device with a sliding hinge as claimed in claim 10 comprising a base having a closing side, an opening side and two mounting recesses separately formed in a top surface of the base adjacent to the opening side of the base;

a cover having two elongated recesses parallelly formed in a bottom surface of the cover and respectively corresponding to the mounting recesses of the base;

the sliding hinge mounted between the base and the cover;

the stationary brackets of the pivoting assemblies of the sliding hinge respectively mounted securely in the mounting recesses of the base;

the tracks of the sliding assemblies of the sliding hinge respectively mounted securely in the elongated recesses of the cover; and the ends of the retractable positioning assemblies where the connectors are mounted pivotally connected to the cover.

\* \* \* \* \*